US012453976B2

(12) United States Patent
Bittner

(10) Patent No.: US 12,453,976 B2
(45) Date of Patent: Oct. 28, 2025

(54) FLOW-THROUGH CENTRIFUGE AND METHOD FOR BRINGING ABOUT AN OPERATIONAL STATE OF A FLOW-THROUGH CENTRIFUGE

(71) Applicant: Sartorius Stedim Biotech GmbH, Göttingen (DE)

(72) Inventor: Fabian Bittner, Hardegsen (DE)

(73) Assignee: Sartorius Stedim Biotech GmbH, Göttingen (DE)

( * ) Notice: Subject to any disclaimer, the term of this patent is extended or adjusted under 35 U.S.C. 154(b) by 0 days.

(21) Appl. No.: 19/037,842

(22) Filed: Jan. 27, 2025

(65) Prior Publication Data

US 2025/0170589 A1 May 29, 2025

Related U.S. Application Data

(63) Continuation of application No. PCT/EP2023/071953, filed on Aug. 8, 2023.

(30) Foreign Application Priority Data

Aug. 12, 2022 (EP) .................................... 22190249

(51) Int. Cl.
*B04B 5/04* (2006.01)
*B04B 7/00* (2006.01)
(Continued)

(52) U.S. Cl.
CPC .............. *B04B 5/0442* (2013.01); *B04B 7/00* (2013.01); *B04B 9/08* (2013.01); *B04B 9/14* (2013.01); *F16H 9/26* (2013.01)

(58) Field of Classification Search
CPC ... B04B 5/0442; B04B 2005/049; B04B 9/08; B04B 9/14; B04B 7/00; F16H 9/26
See application file for complete search history.

(56) References Cited

U.S. PATENT DOCUMENTS 3,586,413 A 6/1971 Adams
4,216,770 A 8/1980 Cullis et al.
(Continued)

FOREIGN PATENT DOCUMENTS

DE 4330905 A1 3/1995
EP 2310486 B1 1/2017
(Continued)

OTHER PUBLICATIONS

English Translation of the International Preliminary Report on Patentability, dated Feb. 4, 2025, from corresponding International Application No. PCT/EP2023/071953.

*Primary Examiner* — Lori Wu
(74) *Attorney, Agent, or Firm* — Thomas | Horstemeyer, LLP

(57) ABSTRACT

The invention relates to a flow-through centrifuge which is used, for example, for biotechnical applications, in particular as a blood centrifuge. A driving arrangement and/or transmission arrangement of the flow-through centrifuge comprises a planetary gearset. In the planetary gearset, at least one planetary belt pulley is rotatably supported on a rotating planet carrier. A torque of the planetary belt pulley is transmitted via a belt. The planet carrier and the planetary belt pulley are driven at different rotational speeds. According to the invention, the planet carrier is held by a belt tensioning unit rotating with the planet carrier. A distance of (Continued)

the planet carrier from a rotor axis can be changed via the belt tensioning unit in order to adjust the belt tension of the belt.

16 Claims, 6 Drawing Sheets

(51) Int. Cl.
  *B04B 9/08* (2006.01)
  *B04B 9/14* (2006.01)
  *F16H 9/26* (2006.01)

(56) References Cited

U.S. PATENT DOCUMENTS

| | | | |
|---|---|---|---|
| 4,228,009 A * | 10/1980 | Ito | G01N 30/42 210/511 |
| 4,389,206 A | 6/1983 | Bacehowski et al. | |
| 4,419,089 A | 12/1983 | Kolobow et al. | |
| 4,430,216 A * | 2/1984 | Ito | B01D 11/048 210/511 |
| 5,114,589 A | 5/1992 | Shibusawa et al. | |
| 5,558,769 A | 9/1996 | Witthaus et al. | |
| 5,665,048 A | 9/1997 | Jorgensen | |
| 7,688,449 B2 | 3/2010 | Ogawa et al. | |
| 9,090,910 B2 | 7/2015 | Mehta et al. | |
| 9,279,133 B2 | 3/2016 | Mehta et al. | |
| 9,334,927 B2 | 5/2016 | Manzella et al. | |
| 9,839,920 B2 | 12/2017 | Mehta et al. | |
| 10,208,283 B2 | 2/2019 | Mehta et al. | |
| 10,888,878 B2 | 1/2021 | Mehta et al. | |
| 2002/0119881 A1 * | 8/2002 | Wood | B04B 9/12 494/33 |
| 2009/0247384 A1 * | 10/2009 | Overberg | B04B 1/2016 494/51 |
| 2023/0250384 A1 | 8/2023 | Saballus et al. | |

FOREIGN PATENT DOCUMENTS

| | | |
|---|---|---|
| EP | 2485846 B1 | 7/2019 |
| EP | 3936601 A1 | 1/2022 |
| JP | H06500176 A | 1/1994 |
| JP | 2008-008875 A2 | 1/2008 |
| WO | WO2013043316 A1 | 3/2013 |

* cited by examiner

FLOW-THROUGH CENTRIFUGE AND METHOD FOR BRINGING ABOUT AN OPERATIONAL STATE OF A FLOW-THROUGH CENTRIFUGE

CROSS REFERENCE TO RELATED APPLICATIONS

This application is a continuation of International Application No. PCT/EP2023/071953 with an international filing date of Aug. 8, 2023 and claiming priority to co-pending European Patent Application No. EP 22 190 249.7 entitled "Durchflusszentrifuge und Verfahren zur Herbeiführung eines betriebsbereiten Zustands einer Durchflusszentrifuge", filed on Aug. 12, 2022, the disclosures of which are hereby incorporated herein by reference in their entirety.

FIELD OF THE INVENTION

The invention relates to a flow-through centrifuge in which at least one medium is at least temporarily supplied to a centrifugation chamber and/or a medium is discharged from the centrifugation chamber while the centrifugation chamber is rotating. The at least one medium is, in particular, the medium to be centrifuged, a rinsing liquid, a washing solution or buffer solution, a modified medium extracted from the centrifuged medium and/or a sediment in the centrifugation chamber.

To give only a few non-limiting examples of the invention, the flow-through centrifuge may be a blood centrifuge in which the medium to be centrifuged is blood and the extracted modified medium or sediment is blood cells or particles, or a flow-through centrifuge by means of which cells, microcarriers or other particles contained in the medium are to be extracted from a medium. It is also possible that the centrifuged medium is not a pure liquid, but rather a solution or suspension with particles such as cells, cell debris or parts of cells etc.

The flow-through centrifuge is used, for example, for the production of biopharmaceutical products in biopharmaceutical companies or in bioprocessing applications. The flow-through centrifuge can be used, for example, to obtain and/or clarify cells or microcarriers. The cells obtained in this way can also be used for cell therapy. Another field of application for the flow-through centrifuge is, for example, the production of vaccines.

BACKGROUND OF THE INVENTION

Flow-through centrifuges of this type are distributed, for example, by the company Sartorius AG, Otto-Brenner-Straße 20, 37079 Göttingen, Germany, and affiliated companies under the label "Ksep" (registered trademark). On the website relating to these flow-through centrifuges
www.sartorius.com/en/products/process-filtration/cell-harvesting/ksep-systems
(Date of inspection: Jul. 6, 2022)
the operating principle of a flow-through centrifuge, as it can also be used for the present invention, is described as follows on the basis of a linked video:
A rotor of the flow-through centrifuge comprises four centrifugation chambers, which can be embodied as blood bags held on a rotor body and which are evenly distributed around the circumference. The centrifugation chambers are arranged at equal radial distances from the rotor's axis of rotation. A first connection line opens radially inwards into a centrifugation chamber, while a second connection line opens radially outwards into the centrifugation chamber. In a first operating phase, a first medium embodied as blood, for example, is fed to the centrifugation chamber via the second connection line while the centrifugation chamber rotates with the rotor. In the centrifugation chamber, particles contained in the blood (e.g. blood bodies) are deposited radially on the outside as a result of the centrifugation, while the residual medium (i.e. the medium supplied radially on the outside reduced by the particles pushed radially outwards) is discharged from the centrifugation chamber radially on the inside via the first connection line. In this first operating phase, the first connection line is therefore a discharge line, while the second connection line is a supply line. As this operation continues, the proportion of particles and their concentration in the centrifugation chamber increases until the chamber is largely and finally completely filled with particles. In a subsequent optional second operating phase, the particles in the centrifugation chamber are washed. For this purpose, a washing solution or buffer solution is fed into the centrifugation chamber via the second connection line. The washing solution or buffer solution rinses through the centrifugation chamber and is discharged radially inwards via the first connection line. In this operating phase, the centrifugation chamber also rotates with the rotor so that the particles are prevented from exiting the centrifugation chamber with the washing solution or buffer solution via the first connection line as a result of the centrifugation force. During the second operating phase, the first connection line also serves as a discharge line for the washing solution or buffer solution, while the first connection line serves as a supply line for the washing or buffer solution. In a subsequent third operating phase, the centrifugation chamber continues to rotate with the rotor. In the third operating phase, the direction of flow through the centrifugation chamber is reversed and the particles are removed from the centrifugation chamber via the second connection line, while washing solution or buffer solution can be fed into the centrifugation chamber via the first connection line. The third operating phase ends when all the particles have been removed from the centrifugation chamber. This can be followed by successive further cycles with the three operating phases described above.

A generic flow-through centrifuge is described, for example, in EP 3 936 601 A1 (corresponding to US patent application US 2023/0250384 A1). EP 3 936 601 A1 shows the medium network, which is connected to the connection lines and ensures the different operating phases. Reference is made to EP 3 936 601 A1, EP 2 310 486 B1 (corresponding to U.S. Pat. No. 9,090,910 B2, U.S. Pat. No. 9,279,133 B2 and U.S. Pat. No. 10,208,283 B2) and EP 2 485 846 B1 as examples with regard to this medium network, the pump arrangement contained therein, the process control unit, an additional filter arrangement, receptacles for the various media and with regard to the process sequence.

EP 2 485 846 B1 (corresponding to US patents U.S. Pat. No. 9,839,920 B2 and U.S. Pat. No. 10,888,878 B2) describes that in flow-through centrifuges, fluidic connections to connecting lines rotating with the rotor by means of rotary transmission leadthroughs are problematic, as the rotary transmission leadthroughs are susceptible to leaks and entail the risk of undesired contamination of the media. On the other hand, it is explained that according to U.S. Pat. Nos. 4,216,770, 4,419,089, 4,389,206 and 5,665,048 connecting strands are used in which the connecting lines can be integrated. One end portion of the connecting strand is fixed to the housing, while the other end portion of the connecting strand is fixed to the rotor and is rotated together with the rotor.

To prevent the twisting of the connecting strand from increasing as a result of the rotation of the rotor and the relative twisting of the end portions of the connecting strand, the connecting strand is additionally guided in a guiding tube. The guiding tube has a section comprising the shape of a rounded U with side legs of different lengths that are slightly spread apart. The opening of the U points in the direction of the rotor's axis of rotation. Starting from the end portion fixed to the housing, the connecting strand curves outwards and enters a side leg of the U. In the U-shaped section, the connecting strand is guided for passing around the rotor by the guiding tube. The free end portion of the other side leg of the U of the guiding tube is curved back so that it is arranged coaxially to the rotational axis of the rotor and directly adjacent to the entry of the connecting strand into the rotor. The guiding tube is then driven at half the rotational speed of the rotor. EP 2 485 846 B1 refers to U.S. Pat. No. 3,586,413 for an explanation of how to avoid increasing twisting of the connecting strand by using the rotating guiding tube.

SUMMARY OF THE INVENTION

The invention relates to a flow-through centrifuge which has a driving arrangement and/or transmission arrangement. By means of the driving arrangement and/or transmission arrangement, it is ensured that, on the one hand, the rotor is driven at a first rotational speed, while a compensating rotor, planet carrier and/or guiding tube is driven at a second rotational speed which is twice as high as the first rotational speed at which the rotor is driven.

A planetary gearset is used in the driving arrangement and/or transmission arrangement. In the planetary gearset, at least one planetary belt pulley is rotatably mounted on a planet carrier. A torque is transmitted to or from the planetary belt pulley via a belt, in particular a toothed belt. The use of a toothed belt for transmitting a torque in the planetary gearset is advantageous compared to the design of the gear arrangement according to the prior art EP 2 485 846 B1, in which gear wheels mesh directly with each other in the gear arrangement, since the use of the belt in particular can lead to an improvement of the smooth running of the rotor, which in turn is advantageous for avoiding undesirable mixing of the medium to be centrifuged, and/or the use of the belt enables an extension of the options for designing the installation space. Furthermore, the use of a belt drive can eliminate the need for lubrication with oil and avoid wear, abrasion or residues, which can at least reduce undesirable contamination. Under certain circumstances, the flow-through centrifuge according to the invention can also make use of the fact that, for a transmission by means of a belt, a driving belt wheel and a driven belt wheel comprise the same direction of rotation, whereas in the case of directly meshing gear wheels, the direction of rotation is reversed, so that a third gear wheel is required to maintain the direction of rotation.

In the context of the invention, the planet carrier and the planetary belt pulley rotate at different rotational speeds, the planet carrier preferably rotating at the second rotational speed about a rotor axis, while the planetary belt pulley preferably rotates at the first rotational speed about a rotational axis defined by the planet carrier or a web or planetary shaft thereof rotating at the second rotational speed.

In principle, it would be possible for the belt to comprise an elasticity such that it can be press mounted over the planetary belt pulley (and an associated drive belt pulley or output belt pulley or sun belt pulley), which would, however, result in a fixed dependency of the assembly forces, the elasticity of the belt, the contact pressure of the belt on the planetary belt pulley and the oversize of a lateral guiding disc of the planetary belt pulley. On the other hand, it is possible that the belt comprises a certain excess length and the required belt tension is provided by an elastically biased belt tensioning wheel. However, the investigations on which the invention is based have shown that the use of such an elastically loaded belt tensioning wheel is disadvantageous, since in the flow-through centrifuge the spring-biased belt tensioning wheel has to rotate at the second rotational speed, which leads to centrifugal force-dependent deflections of the belt tensioning wheel, which are speed-dependent and change the belt tension in an undesirable manner.

Based in particular on these findings, the invention proposes that in the flow-through centrifuge according to the invention, the planet carrier is supported by a belt tensioning unit. The belt tensioning unit is embodied such that the distance of the planet carrier from a rotor axis can be adjusted by means of the same. In this case, the belt tensioning unit can support or hold the planet carrier on a compensating body of a compensating rotor in such a way that the distance of the planet carrier from the rotor axis can be changed.

The use of the belt tensioning unit according to the invention makes it possible, for example, for the belt to first be placed on the planetary belt pulley for a first distance of the planet carrier and thus of the planetary belt pulley from the rotor axis. The first distance is chosen to be small enough to allow the belt to be fitted with small forces. After this installation of the belt, the distance of the planet carrier and thus of the planetary belt pulleys from the rotor axis can then be changed to a second, larger distance, thereby bringing about the required belt tension, which can also be done by measuring the belt tension while changing the distance or iteratively changing the distance with iterative measurement of the belt tension. The belt tensioning unit can then be fixed so that the distance of the planet carrier from the rotor axis can no longer be changed. The fixing is carried out in such a way that the distance is not changed as a result of the centrifugation forces that occur during operation of the flow-through centrifuge.

The invention includes embodiments in which only one belt is present, which is then supported by an associated planet carrier via a belt tensioning unit. It is also possible that two planetary belt pulleys are used, each with associated belts, in which case it is possible that the planetary belt pulleys are then each supported by an associated planet carrier by an associated belt tensioning unit. For a particular proposal of the invention, the flow-through centrifuge has two planetary belt pulleys that are connected to each other in a rotationally fixed manner, for example via a planetary shaft. The two planetary belt pulleys connected to each other in this way thus form a kind of double or stepped planet, the diameter of the two planetary belt pulleys preferably being the same. The planetary belt pulleys, which are firmly connected to each other in this way, are then rotatably mounted on a common planet carrier. In this case, a common belt tensioning unit can be used to change the distance of the two planetary belt pulleys in common.

A further proposal of the invention comprises a more specific embodiment of the flow-through centrifuge, the gear arrangement and/or the planetary gearset. For this proposal, a rotor comprising the centrifugation chambers is rotated about the rotor axis at a first rotational speed for centrifugation. As also explained at the beginning, a medium is supplied to the rotor during centrifugation and/or a medium is discharged from the rotor during centrifugation. The flow-through centrifuge has a connecting strand comprising at least one supply line and at least one discharge line for a medium. One end portion of the connecting strand is held on a housing of the flow-through centrifuge and is therefore stationary. In this end portion, the connecting strand can be supplied with the medium, for example via a pump, or the medium can be discharged in this end portion. In the other end portion, the connecting strand is held on the rotor so that this end portion serves to provide a coupling for the medium with the centrifugation chamber of the rotor. The two end portions are rotated relative to each other at the first rotational speed. The two end portions are arranged coaxially to the rotor axis of the rotor. The connecting strand is curved in such a way that the two end portions both point in the same direction, namely in the direction of entry into the rotor. In accordance with the invention, the flow-through centrifuge also has a connecting strand guide, which is in particular embodied as a guiding tube, as has been explained for the prior art cited at the beginning. The connecting strand extends through the connecting strand guide. The connecting strand guide is rotated around the rotor axis at a second rotational speed. The connecting strand guide is used to guide the connecting strand (in a longitudinal section) from a first side of the rotor for passing the rotor on the radial outer side along the rotor, whereby the connecting strand then opens into the rotor on the second side. To ensure that the connecting strand is not twisted, the driving arrangement and/or transmission arrangement is embodied such that the first rotational speed of the rotor is twice as high as the second rotational speed of the connecting strand.

In this case, the planetary gearset has a first sun belt pulley and a second sun belt pulley, which are arranged coaxially to the rotor axis and rotate about it. The first planetary belt pulley and the second planetary belt pulley are non-rotatably connected to each other. The first sun belt pulley is connected to the first planetary belt pulley via a first belt. Correspondingly, the second planetary belt pulley is connected to the second sun belt pulley via a second belt. The first sun belt pulley is driven at the first rotational speed. The planet carrier (preferably held on a compensating body of a compensating rotor) is driven at the second rotational speed. The second sun belt pulley drives the rotor (preferably directly). In this case, the planet carrier is rotated together with the connecting strand guide. Preferably, the planet carrier, the connecting strand guide and a base body or drum body together form the compensating body, which establishes a rigid structural unit after the belt tensioning unit is fixed and which forms the compensating rotor.

To enable the distance from the rotor axis to be changed, the belt tensioning unit can comprise any desired adjustment device and/or guiding device. For example, the belt tensioning unit may have a slotted or curved link of a link motion by which it is possible to change the position and distance of the planet carrier along any curved path, as long as this link provides at least one component in the radial direction. For one proposal, the flow-through centrifuge according to the invention comprises at least one linear guide via which the planet carrier is guided relative to the connecting strand guide. Here, the linear guide can be oriented in a direction radial to the rotor axis or inclined at an acute angle thereto, so that only one component of the linear guide is oriented in the direction radial to the rotor axis.

For the technical design of the linear guide, there are all possibilities known from the state of the art for linear guides. For a particularly simple solution, the linear guide comprises a guiding rod guided in a guiding recess to provide the guiding effect. For example, the guiding rod has a circular cross-section, while the guiding recess comprises a circular guiding eye, which can be provided by a guiding bore. It is possible that a pair of a guiding rod and a guiding recess is used in the linear guide, whereby in this case the two guiding rods and guiding recesses are oriented parallel to each other and specify the radial guiding direction.

To give just one non-limiting example of the invention, the compensation body can support the guiding rod, while the planet carrier forms the guiding recess.

It is possible that the belt tensioning unit can be set to any position in the guiding direction without activating a fixing device, so that the desired distance can be set manually and then the belt tensioning unit and thus the distance from the rotor axis can be fixed. Improved adjustment of the desired distance and thus the belt tension (possibly within a specified tolerance range) can be achieved by using an adjustment device. Depending on how the adjustment device is actuated, the distance of the planet carrier from the rotor axis is then changed.

A particularly simple design of this type of adjustment device comprises an adjusting screw in which a screwing angle of the adjusting screw determines the distance of the planet carrier from the rotor axis. The adjusting screw translates the screwing angle produced by the operator into an axial adjustment movement of the planet carrier, which enables sensitive, translated or geared adjustment. It may also be possible for the adjusting screw to be actuated with a torque wrench to a predetermined torque that correlates with the desired belt tension.

In principle, the adjustment device can be fixed in any way. For one proposal of the invention, additional or exclusive fixing can be achieved by securing the set position of the adjusting screw of the adjustment device via a counter nut.

During operation of the flow-through centrifuge, not only the belt tensioning force but also a speed-dependent centrifugal force may act on the planet carrier and thus the belt tensioning unit, which intends to move the planet carrier and the components held on it (in particular the planetary belt pulleys) outwards away from the rotor axis. In this case, it can be advantageous if (possibly in addition to other securing and/or fixing measures) a stop is provided that specifies a maximum distance of the planet carrier from the rotor axis. If the stop is adjustable, the belt tension can be specified in a first assembly step (for example by actuating the adjustment device), whereby when having induced the final adjustment the stop is moved outwards to such an extent that it does not interact with the planet carrier. However, once the belt tension has been set (and the belt tensioning unit may also have been fixed in some other way), the stop is moved radially inwards towards the rotor axis to such an extent that it comes into action and supports (directly or indirectly) the planet carrier in such a way that movement of the planet carrier radially outwards is blocked by the stop. The stop can then be fixed in this position, which can be achieved by a locking mechanism, a locking pin, a clamping screw or a locking device such as a LOCTITE (registered trademark). If the centrifugal forces then act on the planet carrier and the components held on it during operation of the laboratory centrifuge, the centrifugal forces can be (additionally) supported by the stop.

Using the degree of freedom for adjusting the distance of the planet carrier from the rotor axis may result in a variable imbalance of the balancing body, which depends on the distance set. According to the invention, at least one balancing mass can be provided on a balancing body in the flow-through centrifuge. The distance of the at least one balancing mass from the rotor axis and/or the weight thereof is then dependent on the operating position of the belt tensioning unit and, in particular, the distance of the planet carrier from the rotor axis. Once the desired belt tension has been brought about by actuating the belt tensioning unit in the manner described above and the belt tensioning unit has been fixed, the balancing body can be balanced in a next assembly step. Here, any imbalance due to the operating position of the belt tensioning unit is compensated for by the at least one balancing mass.

A further solution to the object underlying the invention is a method by which an operational state of a flow-through centrifuge, as previously explained, can be brought about. In this case, the distance of the planet carrier from the rotor axis is changed via the belt tensioning unit, in particular by use of an adjustment device thereof, until a predetermined belt tension is brought about in the belt. This can be achieved, for example, by successive displacement of the planet carrier in a radial direction and subsequent measurement of the belt tension, or the belt tension can be measured while the distance is being changed or while the adjustment device is actuated.

All measuring devices generally known for this purpose can be used to measure the belt tension. In one possible embodiment, a measuring device is used in the method according to the invention in which the belt is vibrated, for example by means of a shock, and the belt tension is determined on the basis of the frequency of the transient vibrations of the belt.

In a further embodiment of this method, after the distance of the planet carrier from the rotor axis has been changed in order to set the predetermined belt tension, a weight of at least one balancing mass used for balancing and/or a selection or change of a distance of a balancing mass from the rotor axis is made as a function of the operating position of the belt tensioning unit and thus of the radial position of the planet carrier brought about.

In some embodiments, the driving arrangement and/or transmission arrangement is improved in particular with regard to,
  the assembly and/or
  operational safety and/or
  the provision of specified operating conditions.

Furthermore, in some embodiments the method simplifies to bring about of an operational state of a flow-through centrifuge and/or improves the operational safety and/or the provision of predetermined operating conditions.

Advantageous further embodiments of the invention result from the patent claims, the description and the drawings.

The advantages of features and of combinations of several features mentioned in the description are merely exemplary and can take effect alternatively or cumulatively, without the advantages necessarily having to be achieved by embodiments according to the invention.

With regard to the disclosure—not the scope of protection—of the original application documents and the patent, the following applies: Further features can be taken from the drawings—in particular the geometries shown and the dimensions of several components relative to one another as well as their relative arrangement and effective connection.

The combination of features of different embodiments of the invention or of features of different patent claims is also possible, in deviation from the chosen referrals of the patent claims, and is hereby suggested. This also applies to those features which are shown in separate drawings or are mentioned in their description. These features can also be combined with features of different patent claims. Likewise, features listed in the patent claims can be omitted for further embodiments of the invention. However, this does not apply to the independent patent claims of the granted patent.

The features mentioned in the patent claims and the description are to be understood with regard to their number in such a way that exactly this number or a greater number than the number mentioned can be present, without the explicit use of the adverb "at least" being necessary. Thus, for example, when one element is mentioned, this is to be understood as meaning that exactly one element, two elements or more elements can be present. The features listed in the patent claims may be supplemented by further features or may be the only features of the subject matter of the respective patent claim.

The reference signs contained in the patent claims do not constitute a limitation of the scope of the objects protected by the patent claims. They merely serve for making the patent claims easier to understand.

BRIEF DESCRIPTION OF THE FIGURES

In the following, the invention is further explained and described with reference to preferred embodiments shown in the figures.

DETAILED DESCRIPTION

In the figures and the description, components which correspond or are similar in terms of geometry and/or function are sometimes identified with the same reference number, whereby these can then be distinguished from one another by the additional letters a, b. These components are sometimes referred to without the additional letter. In some cases, reference is also made to these components without the additional letter. In this case, one of the components or both components are then addressed.

Figure 1:
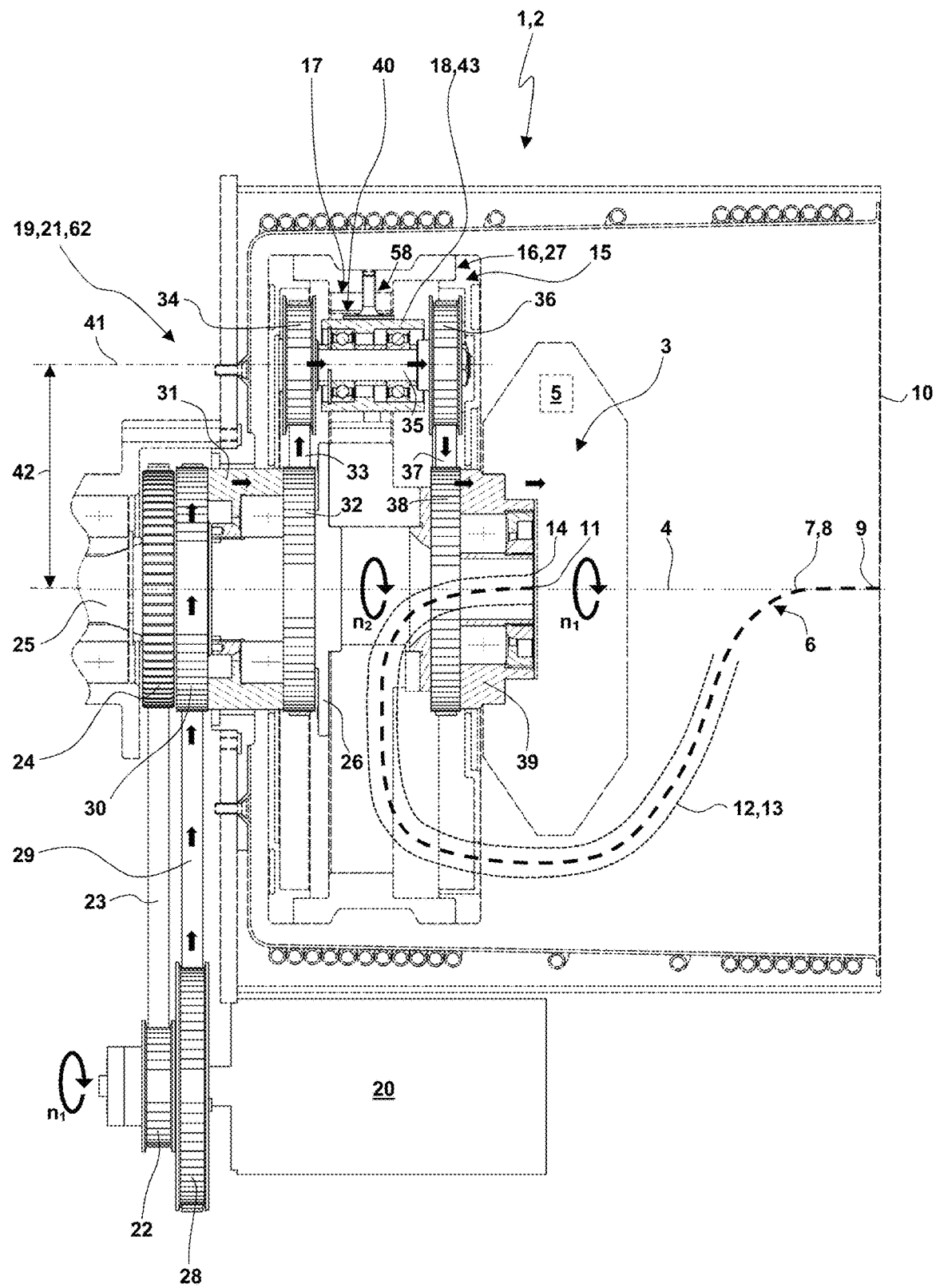
FIG. 1 schematically shows a flow-through centrifuge in a longitudinal section along a rotor axis.

FIG. 1 shows a flow-through centrifuge 1, which is embodied as a blood centrifuge 2, for example.

The flow-through centrifuge 1 has a rotor 3, which is rotated about a rotor axis 4 at a first rotational speed $n_1$. The rotor 3 has several centrifugation chambers 5 that are evenly distributed around the circumference and arranged at equal distances from the rotor axis 4.

The flow-through centrifuge 1 comprises a connecting strand 6, which is only shown in FIG. 1 and only shown schematically with a dashed line. The connecting strand 6 comprises at least one supply line 7 and at least one discharge line 8, via which an exchange of media with the centrifugation chambers 5 is possible, as explained at the beginning.

One end portion 9 of the connecting strand 6 is non-rotatably connected to a stationary housing 10 of the flow-through centrifuge 1. The other end portion 11 of the connecting strand 6 is non-rotatably connected to the rotor 3. During operation of the flow-through centrifuge 1, the end portion 11 of the connecting strand 6 is thus rotated at the first rotational speed $n_1$ relative to the end portion 9 of the connecting strand 6. The end portions 9, 11 are arranged coaxially to the rotor axis 4 and point in the same direction.

A connecting strand guide 12 is embodied as a guiding tube 13. The connecting strand 6 extends through the connecting strand guide 12. By means of the connecting strand guide 12, the connecting strand 6 is guided from a first (in FIG. 1 right-hand) side (which corresponds to the side on which the end portion 9 of the connecting strand 6 is attached to the housing 10) radially outwards from the rotor 3 for passing the rotor 3 to a second (in FIG. 1 left-hand) side of the rotor 3. The connecting strand guide 12 rotates at a second rotational speed $n_2$. In order to avoid increasing twisting of the connecting strand 6 with the rotation of the rotor 3, as explained at the beginning and described in the prior art cited at the beginning, the second rotational speed $n_2$ is half the first rotational speed $n_1$. The shape of the connecting strand guide 12 is only indicated in principle in FIG. 1 and may deviate from the geometry shown in practice. The end portion 14 of the connecting strand guide 12 adjacent to the rotor 3 ends immediately adjacent to the entry point of the connecting strand 6 into the rotor 3, enabling the required relative movement.

The connecting strand guide 12, in particular the guiding tube 13, is a component of a compensating rotor 15, which can also be embodied as a compensating drum. The compensating rotor 15 is a structural unit in which, during operation of the flow-through centrifuge 1, the connecting strand guide 12 is firmly mounted with a compensating body 16, to which a planet carrier 18 is mounted via a belt tensioning unit 17 in a manner explained in more detail below. The entire compensating rotor 15 rotates at the second rotational speed $n_2$.

A driving arrangement and/or transmission arrangement 19 ensures that the rotor 3 is driven at the first rotational speed $n_1$ and the compensating rotor 15 is driven at the second rotational speed $n_2$. Without this necessarily being the case, this is provided for the embodiment shown by a common driving motor 20, which drives the rotor 3 on the one hand and the compensating rotor 15 on the other via its output shaft via two parallel drive branches with different transmission ratios.

For the embodiment shown, a transmission 21, which is interposed between the driving motor 20 and the rotor 3 as well as the compensating rotor 15 and comprises the two drive branches, is embodied as a gear unit without meshing gears. Instead, only belt drives are used here, which are preferably embodied as toothed belt drives.

First, the drive in the second drive path is described, in which the compensating rotor 15 is driven at the second rotational speed $n_2$. In the second drive path, a drive shaft of the driving motor 20 drives a driving belt pulley 22, which drives an input belt pulley 24 via a belt 23. The input belt pulley 24 has a diameter that is twice as large as the diameter of the driving belt pulley 22. If the driving motor 20 is driven at the first rotational speed $n_1$, this results in a rotation of the input belt pulley 24 at half the second rotational speed $n_2$. The input belt pulley 24 is firmly connected to an input shaft 25, which extends into the interior of the compensating rotor 15. In the inner end portion, the input shaft 25 has a flange 26, in the region of which the input shaft 25 is firmly connected to the compensating rotor 16 of the compensating rotor 15.

The drive movement of the driving motor 20 in the second drive path is thus transmitted via the drive shaft of the motor 20, the driving belt pulley 22, the belt 23, the input belt pulley 24, the input shaft 25, the flange 26 and the compensating body 16 of the compensating rotor 15, so that the latter rotates at the second rotational speed $n_2$.

The compensating body 16 preferably has a supporting body 27, which is embodied in a rough approximation as a circular disc and comprises a recess 48 in a circumferential region for receiving the belt tensioning unit 17 and the planet carrier 18 and which is held on the flange 26.

In the first drive path, the drive shaft of the driving motor 20 drives a driving belt pulley 28, the diameter of which is twice as large as the diameter of the driving belt pulley 22. The driving belt pulley 28 drives an input belt pulley 30 via a belt 29. The diameter of the input belt pulley 30 preferably corresponds to the diameter of the input belt pulley 24 and is twice as large as the diameter of the driving belt pulley 28. The rotary movement of the input belt pulley 30 is transmitted rigidly via a hollow shaft 31 to a sun belt pulley 32. The input shaft 25 extends through the input belt pulley 30, the hollow shaft 31 and the sun belt pulley 32 in such a way that the required relative movement is possible.

The rotary movement of the sun belt pulley 32 is transmitted via a belt 33 to a planetary belt pulley 34. The planetary belt pulley 34 is firmly connected to a planetary shaft 35, which in turn is firmly connected to a planetary belt pulley 36. The planetary belt pulleys 34 and 36 comprise the same diameters. The planetary belt pulley 36 drives a sun belt pulley 38 via a belt 37. The sun belt pulley 38 is preferably replaceable, but during operation of the flow-through centrifuge 1 firmly connected to the rotor 3, which for the illustrated embodiment example is accomplished by an intermediate arrangement of a hollow shaft 39.

The connecting strand guide 12 and the connecting strand 6 arranged therein extend through a bore in the sun belt pulley 38 and through the hollow shaft 39 in such a way that the required relative movement is possible.

The planetary shaft 35 is rotatably mounted relative to the planet carrier 18 via a bearing arrangement 40. During operation of the flow-through centrifuge 1, the planet carrier 18 is held firmly on the compensating body 16 or the support body 17 via the belt tensioning unit 17. Thus, the planetary shaft 35 rotates at the second rotational speed together with the compensating rotor 15 about the rotor axis 4.

The input belt pulley 24, the input belt pulley 30, the hollow shaft 31, the sun belt pulley 32, the sun belt pulley 38 and the hollow shaft 39 are arranged coaxially to the rotor axis 4 and these rotate about the rotor axis 4.

In the first drive path, the flow of force thus runs from the drive shaft of the motor 20 via the driving belt pulley 28, the belt 29, the input belt pulley 30, the sun belt pulley 32, the belt 33, the planetary shaft 35, the planetary belt pulley 36, the belt 37 and the sun belt pulley 39 to the rotor 3. In FIG. 1, the flow of force for the first drive path is shown by means of arrows.

The first drive path and the second drive path are coupled to each other via the planetary gearset 62.

A rotational axis 41 of the planetary shaft 35 and the planetary belt pulleys 34, 36 comprises a distance 42 from the axis of rotation 4.

Figure 2:
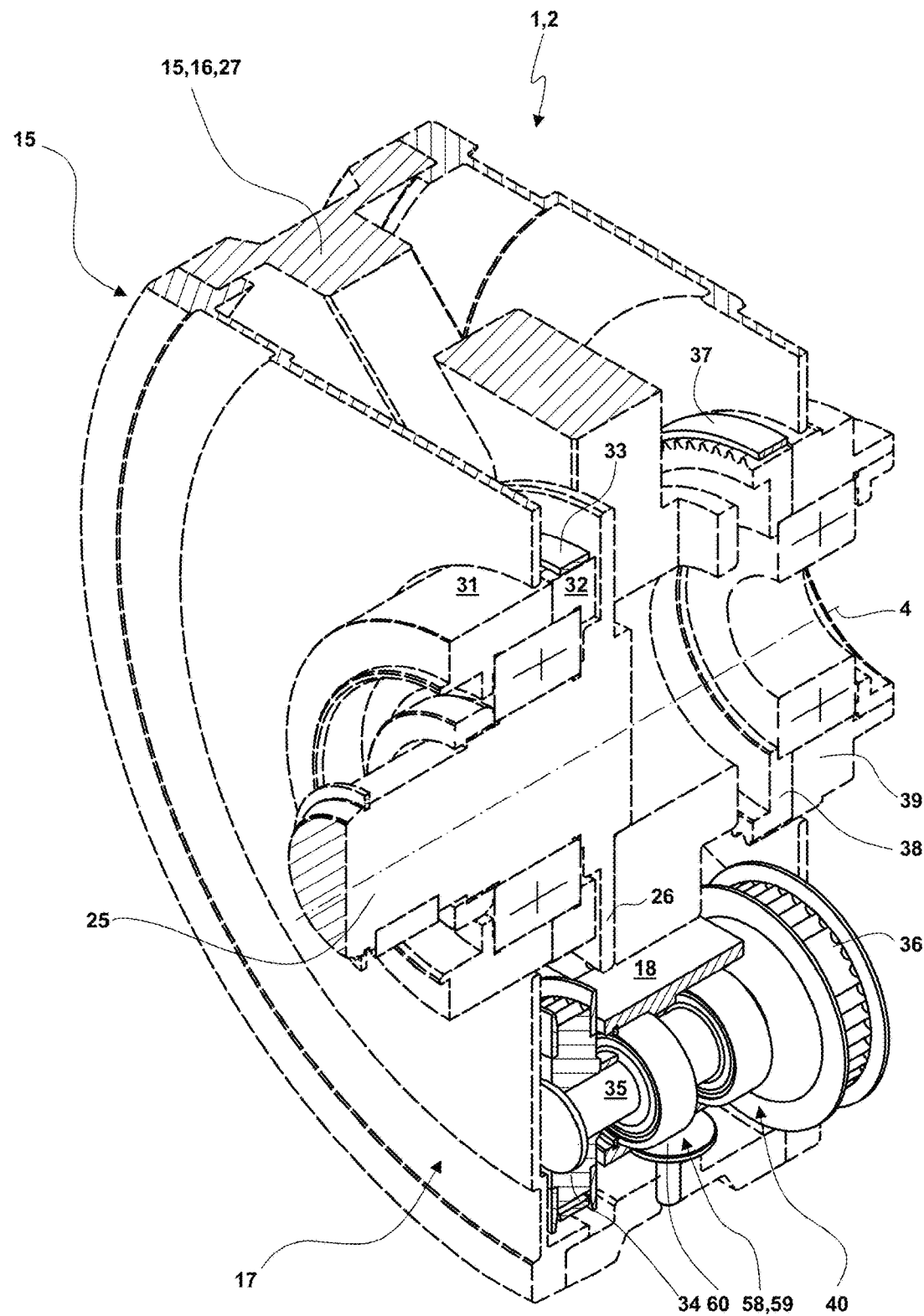
FIG. 2 shows a partial three-dimensional section through the flow-through centrifuge according to FIG. 1.
Figure 3:
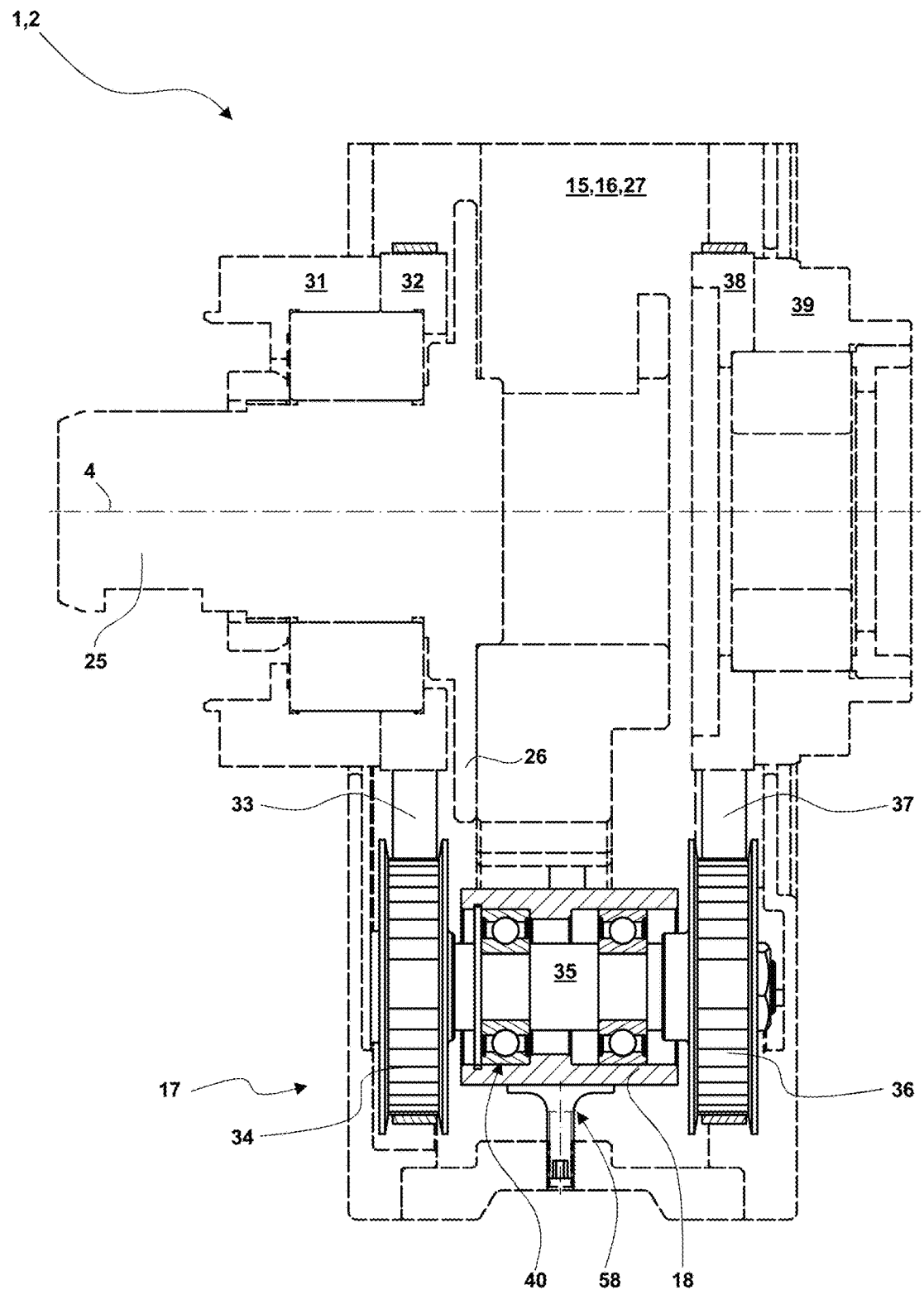
FIG. 3 shows a partial section of the flow-through centrifuge according to FIGS. 1 and 2 along an axis of rotation and through a planet carrier with associated belt tensioning unit.
Figure 6:
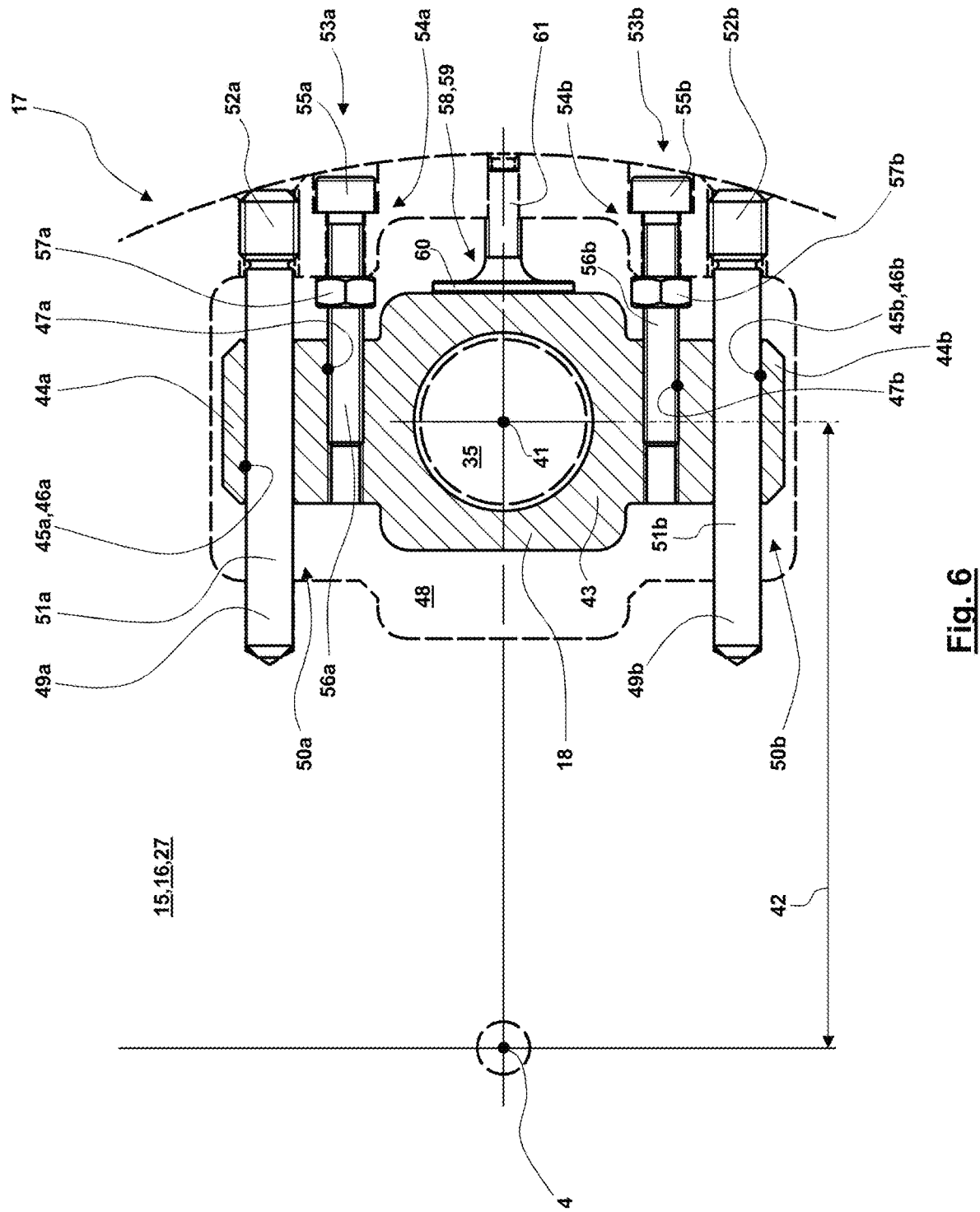
FIG. 6 shows the connection of the planet carrier to a compensation body via the belt tensioning unit in a flow-through centrifuge as shown in FIGS. 1 to 5.

The belt tensioning unit 17, the planet carrier 18, the bearing arrangement 40 and the planetary belt pulleys 34, 36 with the planetary shaft 35 are arranged in a 12-o'clock position in FIG. 1, while these are shown in a 6-o'clock position in FIGS. 2 and 3 and are shown in a 3-o'clock position in FIG. 6, which results from the rotation of the compensating rotor 15 at the second rotational speed about the rotor axis 4 in the different operating positions.

In FIGS. 2 and 3, only a part of the flow-through centrifuge 1 is shown, in particular without the rotor 3 and the driving belt pulleys 22, 28.

Figure 4:
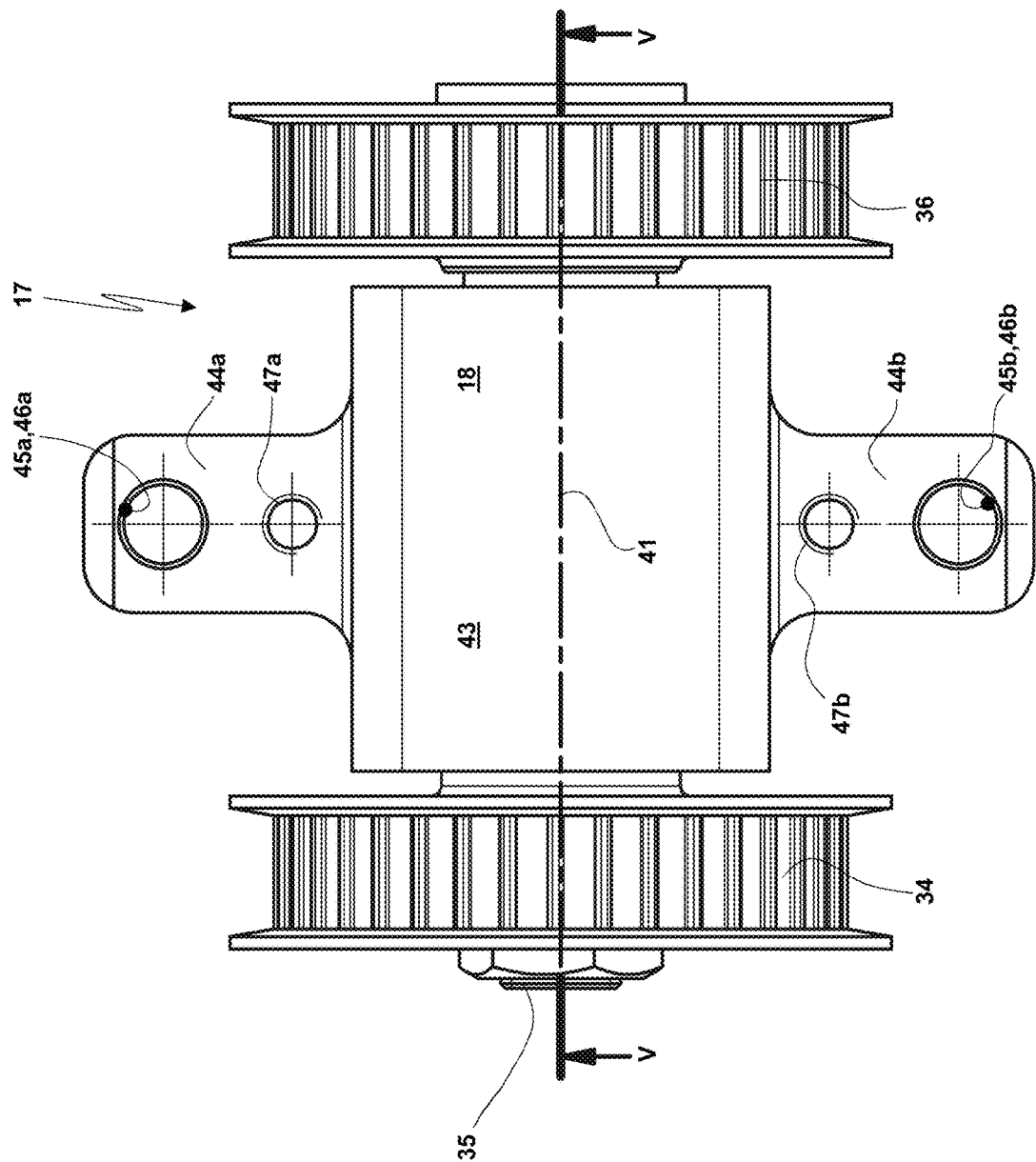
FIG. 4 shows a planet carrier being a sub-assembly with planetary belt pulleys mounted on it and connected to each other in a rotationally fixed manner.
Figure 5:
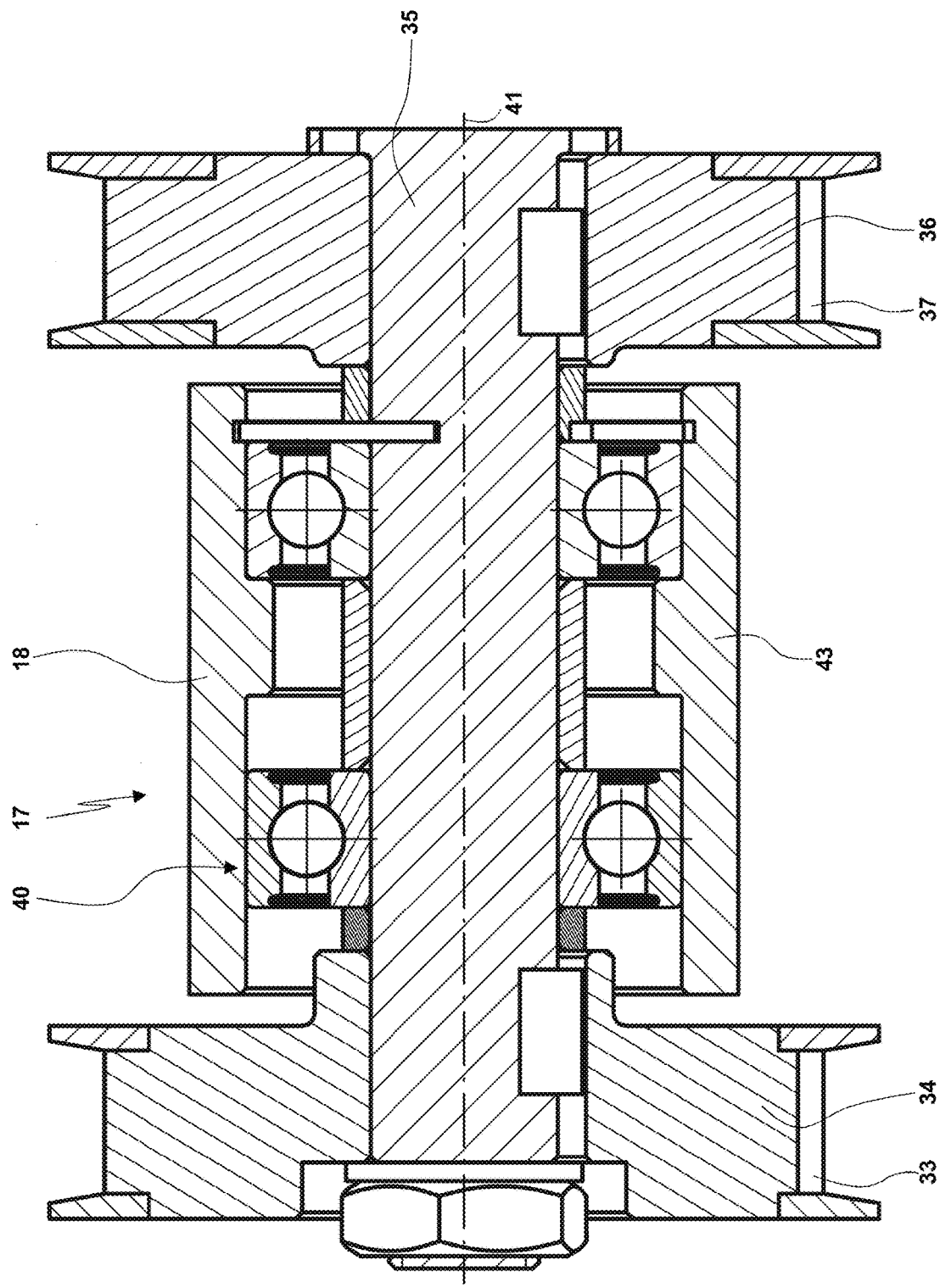
FIG. 5 shows the planet carrier with the planetary belt pulleys connected to each other in a rotationally fixed manner as shown in FIG. 4 in a section V-V.

The function of the belt tensioning unit 17 and provision of the required belt tension of the belts 33, 37 is explained further below:

The design of the belt tensioning unit 17 and its operative connection with the compensating body 16 or support body 27 on the one hand and the planet carrier 18 on the other hand can best be seen in FIGS. 3, 4 and 6.

The planet carrier 18 comprises a bearing sleeve 43, in which the planetary shaft 35 with the planetary belt pulleys 34, 36 is rotatably mounted by means of a bearing arrangement 40, here for example two ball bearings. The planet carrier 18 has protrusions or webs 44 extending transversely to the rotational axis 41. In the end portions facing away from the rotational axis 41, the webs 44 have guiding recesses 45a, 45b, which are embodied here as guiding bores 46a, 46b. Between the guiding recesses 45a, 45b and the bearing sleeve 43, the webs 44 have threaded bores 47a, 47b. The guiding bores 46 and the threaded bores 47 are oriented parallel to each other and have longitudinal axes that run radially to the rotor axis 4 through the rotational axis 41.

The compensating body 16 has a recess 48 in which the belt tensioning unit 17, the planet carrier 18, the bearing arrangement 40 and the planetary shaft 35 with the planetary belt pulleys 34, 36 are mounted. Guiding rods 49a, 49b extend through the recess 48 and through the guiding recesses 45a, 45b of the planet carrier 18. In this way, a linear guide 50 is formed, by means of which the planet carrier 18 is guided in a direction radial to the rotor axis 4 through the rotational axis 41. A movement along the linear guide 50 leads to a change in the distance 42.

For the embodiment shown, the guiding rods 49a, 49b each have a cylindrical portion 51a, 51b and a threaded portion 52a, 52b. The threaded portion 52 is arranged in a radially outer end portion of the guiding rod 49 and is screwed to the compensating body 16. On the other hand, the end portion of the cylindrical portion 51 is accommodated in a blind hole centering bore of the compensation body 17. The planet carrier 18 is guided between the threaded portion 52 and the aforementioned end portion of the cylindrical portion 51 by means of the cylindrical portion 51, in this way the linear guide 50 being formed.

To form an adjustment device 53, adjusting screws 54a, 54b are passed through a bore of the compensating body 16 without threaded engagement until a head 55 of the adjusting screw 54 comes to rest on the outside of the compensating body 16. The threaded portions 56a, 56b projecting into the recess 48 is each screwed to an associated threaded bore 47a, 47b of the planet carrier 18. By changing the screwing angle of the adjusting screws 54, the distance 42 can be changed continuously. Here, depending on the thread pitch of the threaded portion 56a, 56b, a transmission ratio of the screwing angle of the adjusting screw 54 to the change in the distance 42 can be brought about. Once a desired position of the planet carrier 18 and thus a desired belt tension of the belts 33, 37 has been achieved, the position of the planet carrier 18 can be secured by tightening counter nuts 57a, 57b.

Optionally, a stop 58 can be provided for an additional support of centrifugal forces acting on the planet carrier 18 in radial outward direction. The distance of the stop 58 from the rotor axis 4 can be adjusted according to the adjustment of the position of the planet carrier 18. For the illustrated embodiment, the stop 58 is formed by a stop screw 59 with a large-area stop disc 60 at the end. A threaded portion 61 of the stop screw 59 is screwed to a threaded bore of the compensating body 16. The distance of the stop disc 60 from the rotor axis 4 (and thus the distance of the planet carrier 18 from the rotor shaft 4, for which the stop 58 is effective) can be adjusted by changing the screwing angle of the stop screw 59 in the compensating body 16. Preferably, the screwing angle of the stop screw 59 is additionally secured, in particular by using LOCTITE (registered trademark).

According to FIG. 6, two adjustment devices 53a, 53b are used, each with an adjusting screw 54a, 54b. Preferably, the adjusting screws 54a, 54b are successively and partially tightened by a small amount in order to enable uniform tightening without tilting. It is possible that the adjusting screws 54a, 54b are tightened using a torque wrench.

With the sun belt pulleys 32, 38, the planetary belt pulleys 34, 36, the coupling planetary shaft 35 and the planet carrier 18 bearing the planetary belt pulleys 34, 36 as well as the compensating rotor 15 a planetary gearset 62 is established. The two drive paths run over the planetary gearset 62. The two members of the planetary gears 62 which are driven at the different rotational speeds are, on the one hand, the compensating rotor 15 with the planet carrier 18 held on the compensating body 16 and, on the other hand, the sun belt pulley 32 arranged on the input side, while the output of the planetary gears 62 is formed by the sun belt pulley 38 on the output side.

In the present application text, the diameters of the belt pulleys are used to guarantee the required ratios. More strictly speaking, the ratios (here 1:1, 2:1 or 1:2) are based on the corresponding ratios of the teeth of the belt pulleys, which can lead to slight deviations in the diameter ratios.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A flow-through centrifuge comprising
   a) a stationary housing,
   b) a rotor which is rotated about a rotor axis for centrifugation and to which a medium is supplied during centrifugation and/or from which a medium is discharged during centrifugation,
   c) a connecting strand which is held at one end portion adjacent the stationary housing and which is held at the other end portion adjacent the rotor, so that the two end portions are rotated relative to one another at a first rotational speed, the two end portions being arranged coaxially with respect to the rotor axis of the rotor and the connecting strand serving to supply a medium to the rotor and/or to discharge a medium from the rotor, d) a connecting strand guide along or through which the connecting strand extends, the connecting strand guide guiding the connecting strand for passing the rotor on the radial outer side,
e) a driving arrangement or transmission arrangement comprising a planetary gearset driving the rotor at the first rotational speed and the connecting strand guide at a second rotational speed, the first rotational speed differing from the second rotational speed, the planetary gearset comprising a planetary belt pulley which is rotatably supported on a rotating planet carrier,
f) a belt which transmits a torque of the planetary belt pulley in the planetary gearset,
g) a belt tensioning unit supporting the planet carrier, the belt tensioning unit rotating together with the planet carrier and the belt tensioning unit being configured to provide an adjustment of a distance of the planet carrier from the rotor axis.

2. The flow-through centrifuge of claim 1 wherein the one end portion of the connecting strand is fixed to the stationary housing, and the other end portion of the connecting strand is fixed to the rotor.

3. The flow-through centrifuge of claim 1 wherein the planetary belt pulley and a second planetary belt pulley are connected to one another in a rotationally fixed manner and rotatably supported on the planet carrier, and the belt tensioning unit is arranged and configured to provide an adjustment of the distances of the planetary belt pulley and the second planetary belt pulley from the rotor axis in common.

4. The flow-through centrifuge of claim 3 wherein
a) the planetary gearset comprises
  aa) a first sun belt pulley and a second sun belt pulley and
  ab) the planetary belt pulley and the second planetary belt pulley which are non-rotatably connected to one another, the first sun belt pulley being in driving connection with the planetary belt pulley via a first belt and the second planetary belt pulley being in driving connection with the second sun belt pulley via a second belt,
b) the first sun belt pulley is driven at the first rotational speed, the planet carrier is driven at the second rotational speed, the second sun belt pulley drives the rotor and the planet carrier is rotated together with the connecting strand guide.

5. The flow-through centrifuge of claim 1 wherein the belt tensioning unit comprises at least one linear guide by which the planet carrier is guided relative to at least one of the connecting strand guide or a compensating body of a compensating rotor.

6. The flow-through centrifuge of claim 5 wherein the linear guide comprises a guiding rod guided in a guiding recess.

7. The flow-through centrifuge of claim 1 wherein the belt tensioning unit comprises an adjustment device by means of which it is possible to change the distance of the planet carrier from the rotor axis.

8. The flow-through centrifuge of claim 7 wherein a stop is provided which defines a maximum distance of the planet carrier from the rotor axis.

9. The flow-through centrifuge of claim 8 wherein the stop is adjustable.

10. The flow-through centrifuge of claim 7 wherein the adjustment device comprises an adjusting screw.

11. The flow-through centrifuge of claim 10 comprising a counter nut which secures a set position of the adjusting screw.

12. The flow-through centrifuge of claim 1 wherein a stop is provided which defines a maximum distance of the planet carrier from the rotor axis.

13. The flow-through centrifuge of claim 12 wherein the stop is adjustable.

14. The flow-through centrifuge of claim 1 wherein at least one compensating mass is provided on a compensating body, a distance of the at least one compensating mass from the rotor axis and/or a weight of the at least one compensating mass depending on an operating position of the belt tensioning unit.

15. A method for bringing about an operational state of a flow-through centrifuge comprising a driving arrangement and/or transmission arrangement with a planetary gearset, in which a planetary belt pulley is rotatably supported on a rotating planet carrier, a torque of the planetary belt pulley is transmitted via a belt, and the planet carrier and the planetary belt pulley are driven at different rotational speeds, the planet carrier being supported by a belt tensioning unit which rotates together with the planet carrier and the belt tensioning unit being configured to allow an adjustment of a distance of the planet carrier from a rotor axis, the method comprising a method step of adjusting the distance of the planet carrier from the rotor axis by the belt tensioning unit until a predetermined belt tension of the belt is brought about.

16. The method of claim 15 wherein after the distance of the planet carrier from the rotor axis has been changed, a balancing is performed wherein a distance of at least one balancing mass from the rotor axis and/or a weight of at least one balancing mass is adapted dependent on an operational position of the belt tensioning unit.

* * * * *